United States Patent
Norton (10) Patent No.: US 11,015,316 B1
(45) Date of Patent: May 25, 2021

(54) TOP PLATE FOR CRIBBING STACKS AND ASSOCIATED METHODS

(71) Applicant: Cleveland Reclaim Industries, Lorain, OH (US)

(72) Inventor: Tom Norton, Bay Village, OH (US)

(73) Assignee: Cleveland Reclaim Industries, Lorain, OH (US)

( * ) Notice: Subject to any disclaimer, the term of this patent is extended or adjusted under 35 U.S.C. 154(b) by 0 days.

(21) Appl. No.: 15/375,836

(22) Filed: Dec. 12, 2016

Related U.S. Application Data (63) Continuation of application No. 29/526,727, filed on May 13, 2015, now Pat. No. Des. 804,768.

(60) Provisional application No. 62/266,356, filed on Dec. 11, 2015.

(51) Int. Cl.
| | |
|---|---|
| *E02D 29/02* | (2006.01) |
| *E21D 15/48* | (2006.01) |
| *F16M 11/22* | (2006.01) |
| *E21D 15/50* | (2006.01) |
| *E21D 15/02* | (2006.01) |

(52) U.S. Cl.
CPC ......... *E02D 29/0216* (2013.01); *E21D 15/02* (2013.01); *E21D 15/50* (2013.01); *F16M 11/22* (2013.01); *E02D 2200/1678* (2013.01); *E02D 2220/00* (2013.01); *E02D 2300/0006* (2013.01); *E02D 2600/40* (2013.01)

(58) Field of Classification Search
CPC .................................................... E02B 3/129
USPC .......... 405/273; 33/367, 370, 371, 376, 381, 33/382
See application file for complete search history.

(56) References Cited

U.S. PATENT DOCUMENTS

| | | | | |
|---|---|---|---|---|
| 824,525 | A * | 6/1906 | Bonney | |
| 2,245,169 | A * | 6/1941 | Geffcken | B27D 1/04 |
| | | | | 156/219 |
| 3,266,155 | A * | 8/1966 | Staub | E04G 21/1808 |
| | | | | 33/370 |
| 4,944,094 | A * | 7/1990 | Depiano | G01C 9/26 |
| | | | | 33/332 |
| 5,482,408 | A * | 1/1996 | Lunardi | E02D 29/02 |
| | | | | 405/284 |
| 5,746,547 | A * | 5/1998 | Reinmann | E21D 15/483 |
| | | | | 299/11 |
| 5,904,011 | A * | 5/1999 | Biro | B63B 5/06 |
| | | | | 52/177 |
| 6,779,632 | B1 * | 8/2004 | Parks, III | E06C 1/39 |
| | | | | 182/200 |
| 7,097,389 | B1 * | 8/2006 | Skidmore | E21D 15/48 |
| | | | | 299/11 |

(Continued)

OTHER PUBLICATIONS http://www.dictionary.com/browse/texture.*
https://www.merriam-webster.com/dictionary/plate.*

*Primary Examiner* — Sean D Andrish
(74) *Attorney, Agent, or Firm* — Calfee, Halter & Griswold LLP (57) ABSTRACT

A plate for cribbing stacks having a top surface and a bottom surface, first, second, third, and fourth side surfaces connecting the top and bottom surfaces; a first level attached to the first side surface; and a second level attached to the second side surface, the first and second side surfaces being in a non-parallel relationship; and wherein the top and bottom surfaces and the first, second, third, and fourth side surfaces are arranged so that the first and second levels indicate when the plate is horizontal.

8 Claims, 11 Drawing Sheets

(56) References Cited

U.S. PATENT DOCUMENTS

| | | | | |
|---|---|---|---|---|
| 7,676,940 B2* | 3/2010 | Spaulding | ................ | G01C 9/28 33/373 |
| 2001/0049879 A1* | 12/2001 | Moore, Jr. | ........... | G01C 15/008 33/376 |
| 2009/0026427 A1* | 1/2009 | McCallum | ................ | B66F 3/00 254/104 |

* cited by examiner

FIG. 1

Prior Art

FIG. 2

Prior Art

FIG. 3A

Prior Art

FIG. 3B

Prior Art

TOP PLATE FOR CRIBBING STACKS AND ASSOCIATED METHODS

CROSS-REFERENCE TO RELATED APPLICATIONS

The present application claims priority to, and any other benefit of, U.S. Provisional Pat. Appl'n Ser. No. 62/266,356, filed Dec. 11, 2015, the entire disclosure of which is incorporated herein by reference as though recited herein in its entirety. The present application is a continuation-in-part of, and claims priority to, U.S. Design Pat. Appl'n Ser. No. 29/526,727, filed May 13, 2015, the entire disclosure of which is incorporated herein by reference as though recited herein in its entirety.

BACKGROUND

The present disclosure relates to the field of plastic lumber and cribbing and, more specifically, to a top plate for cribbing stacks.

For years, fire departments, industrial plants, mining and construction workers have used wood to crib, block, or stabilize equipment, products and vehicles. As an alternative, plastic cribbing becomes more and more popular since it has no knots and does not split, crack, or splinter. It also does not absorb blood, oil, or most chemicals and is slip-resistant.

Figure 1:
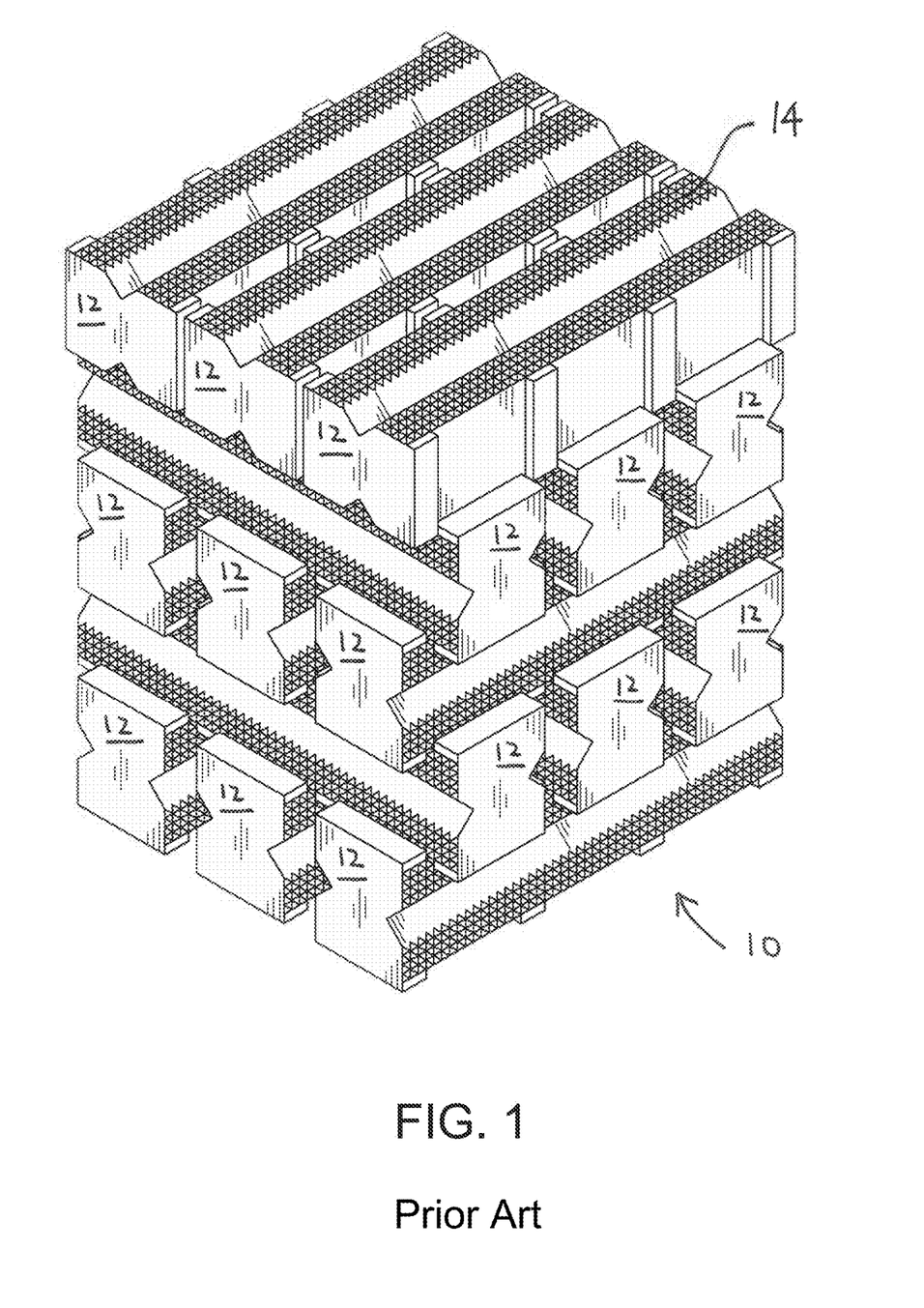
FIG. 1 is a side/top perspective view of an exemplary cribbing stack in prior art.
Figure 2:
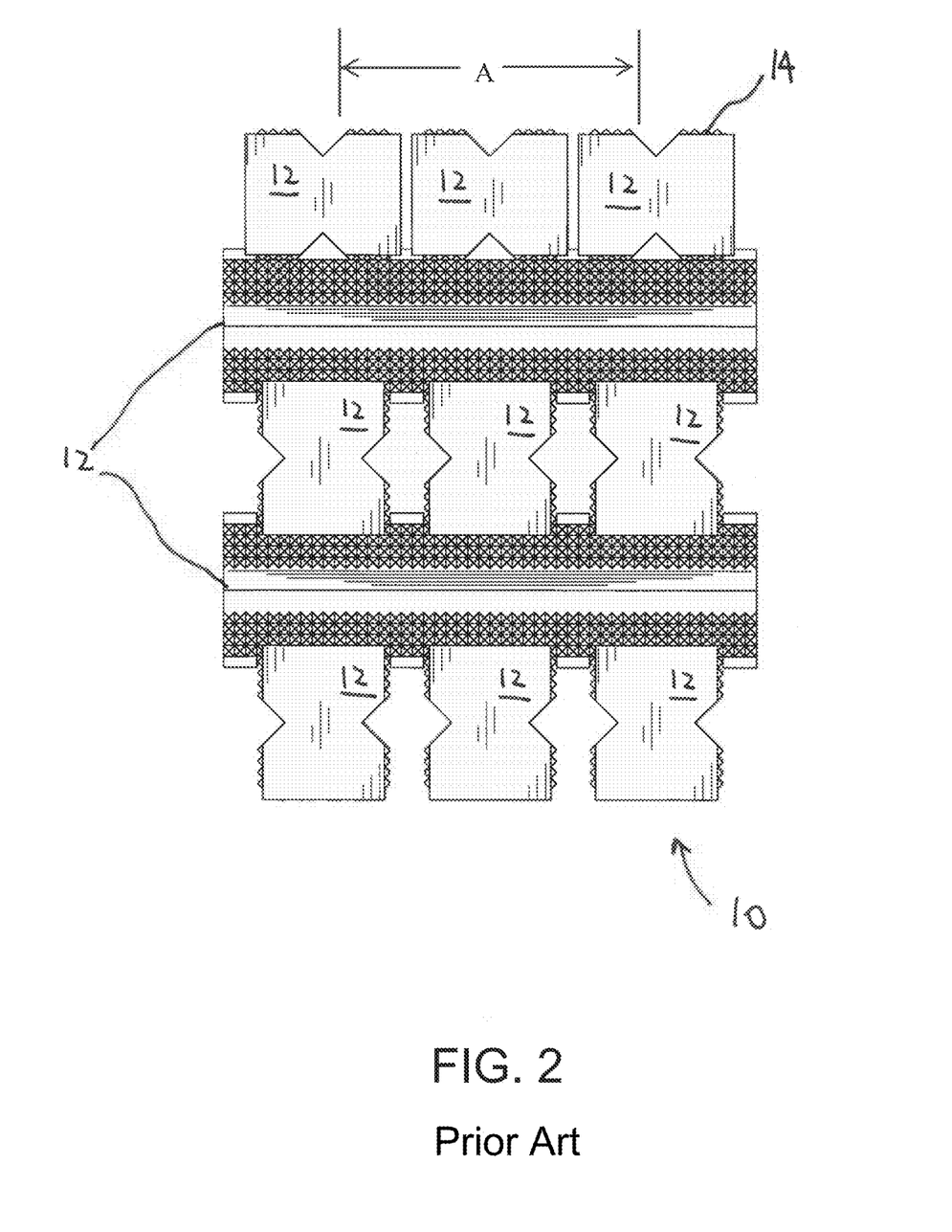
FIG. 2 is a front perspective view of the exemplary cribbing stack of FIG. 1.

Referring to FIGS. 1 and 2, an exemplary cribbing stack 10 in prior art are formed by a plurality of plastic lumber pieces 12. Each lumber piece 12 has two opposing surfaces 14. The surface 14 has pyramid design which is able to securely lock with another pyramid locking surface at any angle. The pyramid design also provides better frictions than normal non-pyramid surface. The lumber piece 12 has three side notches on each side other than the surfaces 14. The side notches are able to interlock the lumber pieces 12 for secure stacking.

Figure 3A:
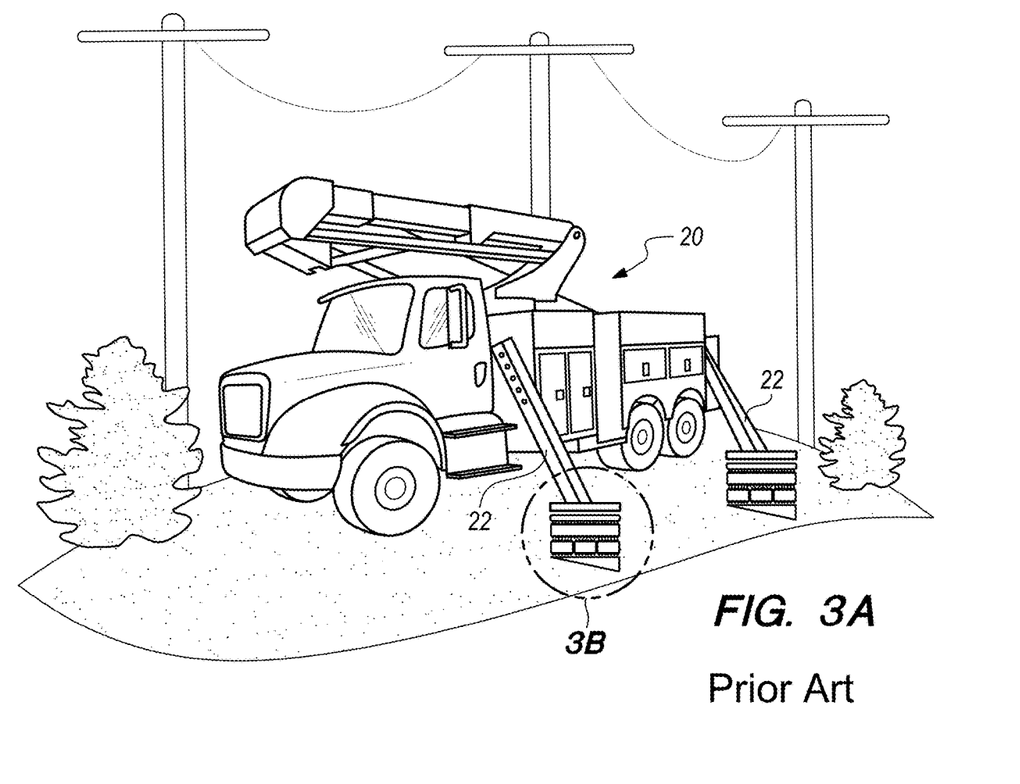
FIGS. 3A and 3B show an exemplary usage of cribbing stacks in prior art.
Figure 3B:
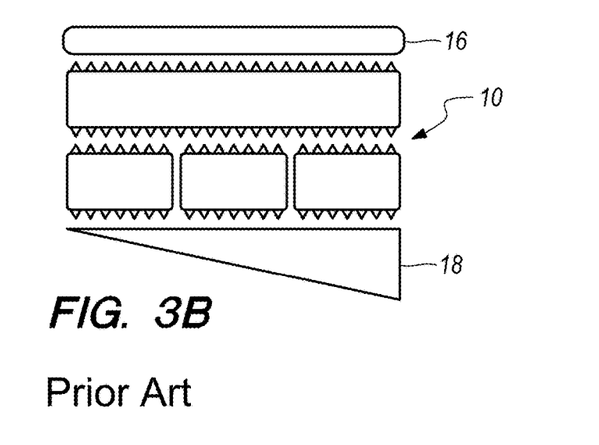
Figure 4:
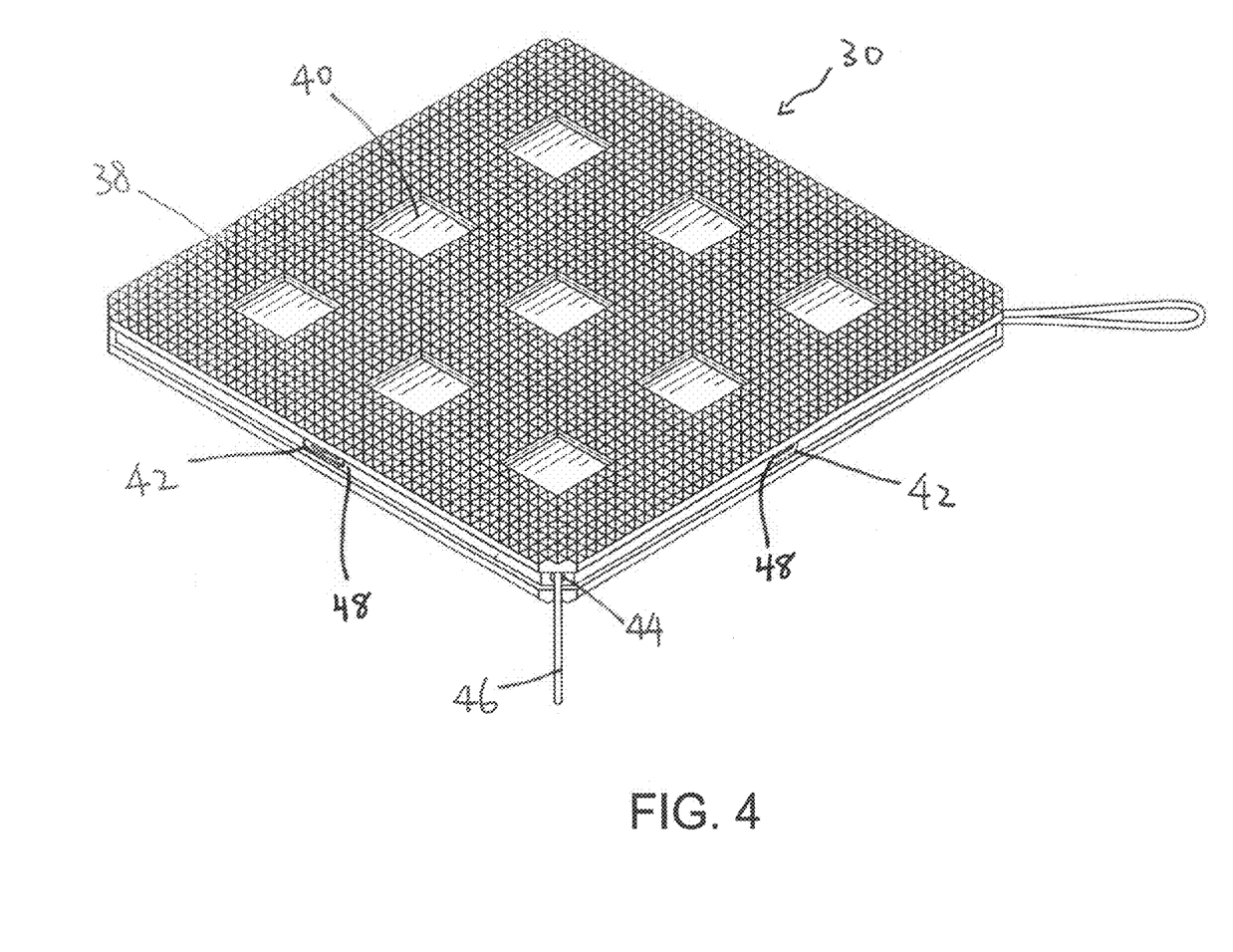
FIG. 4 is a side/top perspective view of an exemplary top plate for cribbing stacks.
Figure 5:
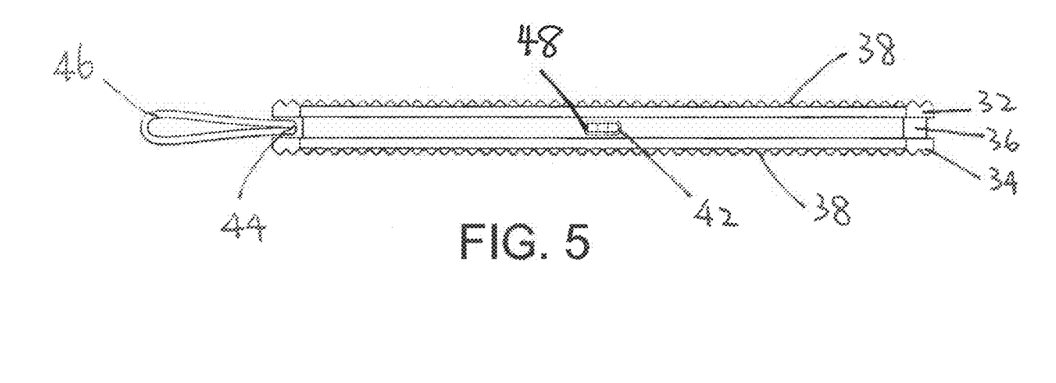
FIG. 5 is a front perspective view of the top plate of FIG. 4.

Referring to FIGS. 3A and 3B, cribbing stack 10 may provide supports to an exemplary utility truck 20. A wedge 18 is inserted under the cribbing stack 10 in order to compensate for uneven ground or loose dirt. A top bag pad 16 covers the top of the cribbing stack 10. A supporting arm 22 of the truck 20 directly contacts with the top bag pad 16 and presses downward.

SUMMARY

The present application discloses a top plate (and intermediate plate) for cribbing stacks methods of using the same.

An exemplary plate for cribbing stacks comprises: a top surface and a bottom surface, first, second, third, and fourth side surfaces connecting the top and bottom surfaces; a first level attached to the first side surface; and a second level attached to the second side surface, the first and second side surfaces being in a non-parallel relationship; and wherein the top and bottom surfaces and the first, second, third, and fourth side surfaces are arranged so that the first and second levels indicate when the top plate is horizontal.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

As taught herein, a top plate is provided for cribbing stacks having a first layer, a second layer, and a middle layer. The middle layer is disposed in between of the first and second layers and is coupled with both the first and second layers. The top plate is substantially flat and expanded in a plane. The top plate further has two levels disposed within the same plane of the top plate. The levels are in a non-parallel relationship, e.g., on adjacent orthogonal sides. The levels can be molded into the plate using an over-molding technique or otherwise affixed to the plate.

Referring now to FIGS. 4-8, an exemplary top plate 30 according to the present application is shown. The top plate 30 is substantially flat and expanded in a plane. The top plate 30 is substantially in a square shape. In an alternative embodiment, the top plate 30 is in a rectangle shape, or any other suitable shapes.

The top plate 30 comprises a first layer 32, a second layer 34, and a middle layer 36. The middle layer 36 is disposed between the first layer 32 and the second layer 34. Three layers 32, 34, and 36 are coupled together. In another alternative embodiment, three layers 32, 34, and 36 are molded into one-piece. A person having ordinary skill in the art may readily understand that, although the following embodiments describe the top plate 30 has three layers 32, 34, and 36. The three layers 32, 34, and 36 may merge into one-piece and the other features of the subject matter still apply to the top plate 30.

The outer sides of both the first layer 32 and the second layer 34 have pyramid interlocking surfaces 38. The slip-resistant pyramid interlocking surface 38 creates a stronger, more stable base than wood. In another alternative embodiment, only one of the first and second layers 32 and 34 has a pyramid locking surface.

The first layer 32 has more than one recess or opening 40. In another alternative embodiment, the first layer 32 has nine recesses or openings 40. The positions of openings 40 correspond to the recesses of the lumber pieces 12, so that the weight of the top plate 30 keeps as light while the surface 38 of the top plate 30 is able to keep substantial touches with the surface 14 of the lumber pieces 12.

In another alternative embodiment, The first layer 32 and the second layer 34 are substantially the same size, shape, and/or structure. In another alternative embodiment, the middle layer 36 is smaller than the first layer 32 and/or the second layer 34.

The top plate 30 further comprises two levels 42. The two levels 42 are attached to the top plate 30 and within the same plane of the top plate 30. The levels 42 are in a non-parallel relationship. In such a way, the levels 42 may indicate whether the top plate 30 is at a horizontal level. In another alternative embodiment, two levels 42 are disposed at two adjacent edges of the top plate 30. In this way, two levels 42 are substantially in an orthogonal relationship. In another alternative embodiment, the levels 42 are disposed at the edges of the middle layer 36 (or otherwise recessed in an indentation 48) and do not excess the edges of the first and second layers 32, 34, so that the levels 42 would not be damaged during operations.

In an alternative embodiment, the top plate 30 further comprises an opening 44 and a rope forming a handle 46. The opening 44 is disposed at a corner of the top plate 30. In an alternative embodiment, the opening 44 is disposed on a corner of the middle layer 36. The rope 46 is coupled with the opening 44, e.g., the plate is overmolded over ends of the rope (not shown). The handle 46 may help a worker to carry or move the top plate 30.

Figure 6:
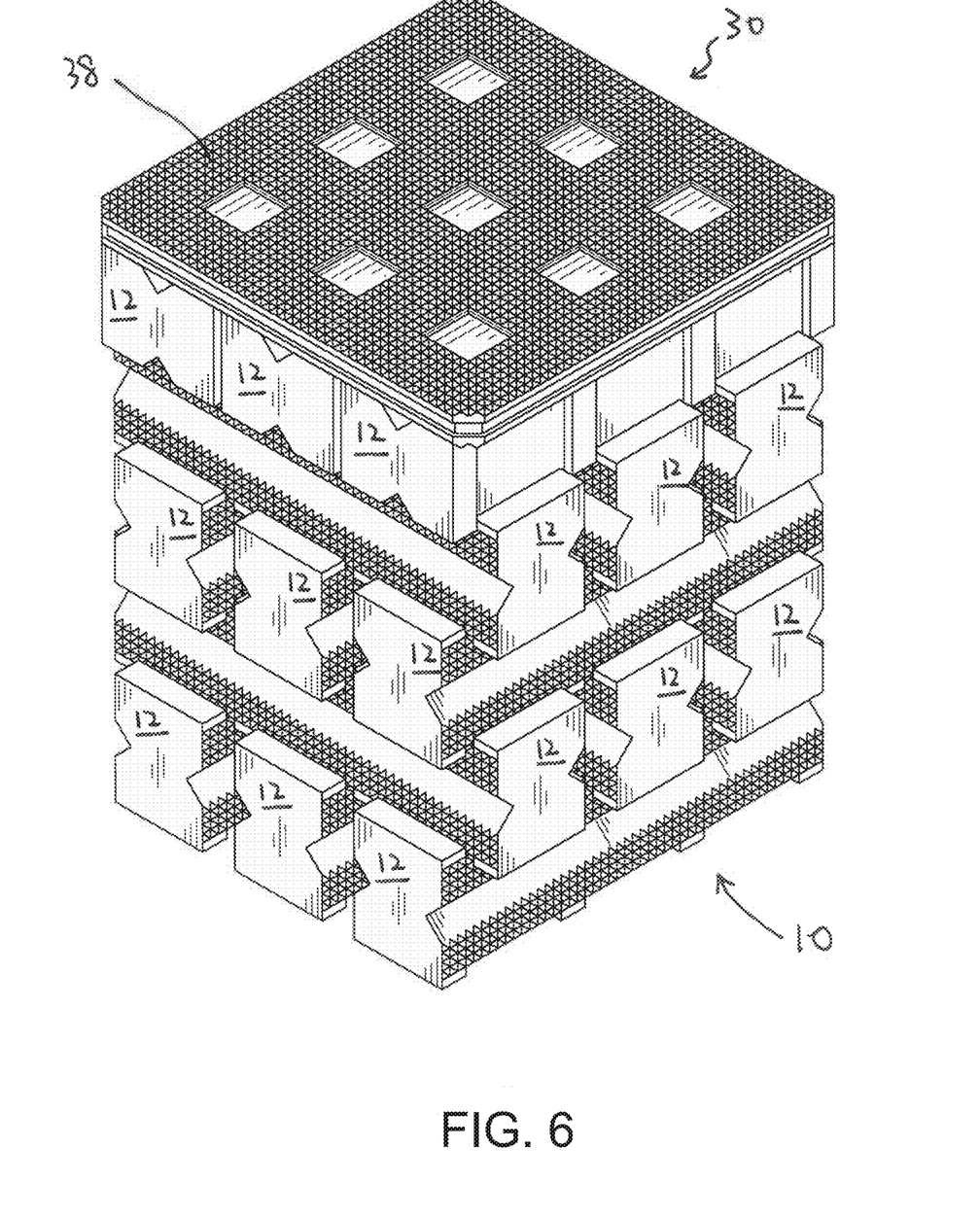
FIG. 6 is a side/top perspective view of an exemplary usage of the top plate of FIG. 4 with the cribbing stack of FIG. 1.
Figure 7:
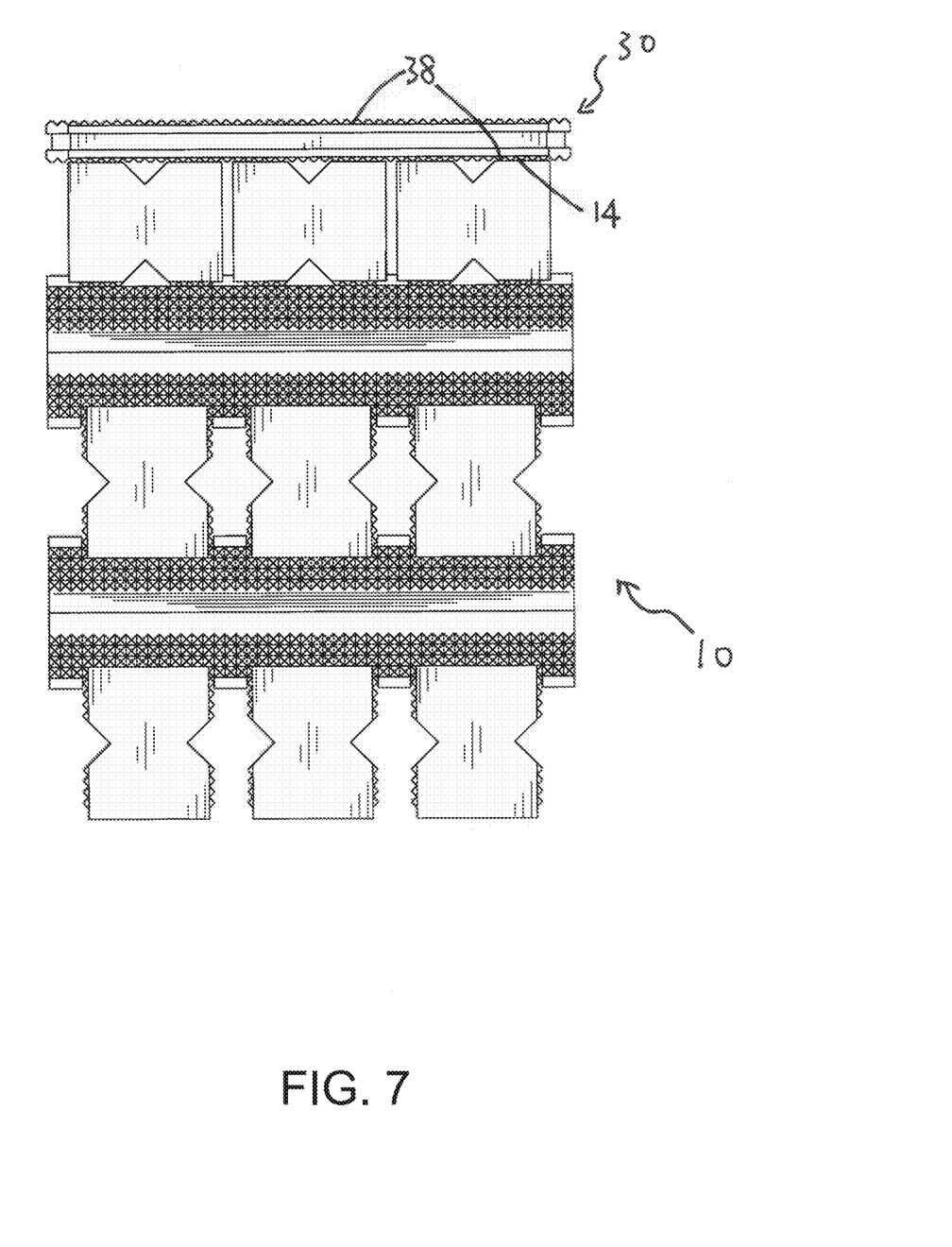
FIG. 7 is a front perspective view of FIG. 6.
Figure 8:
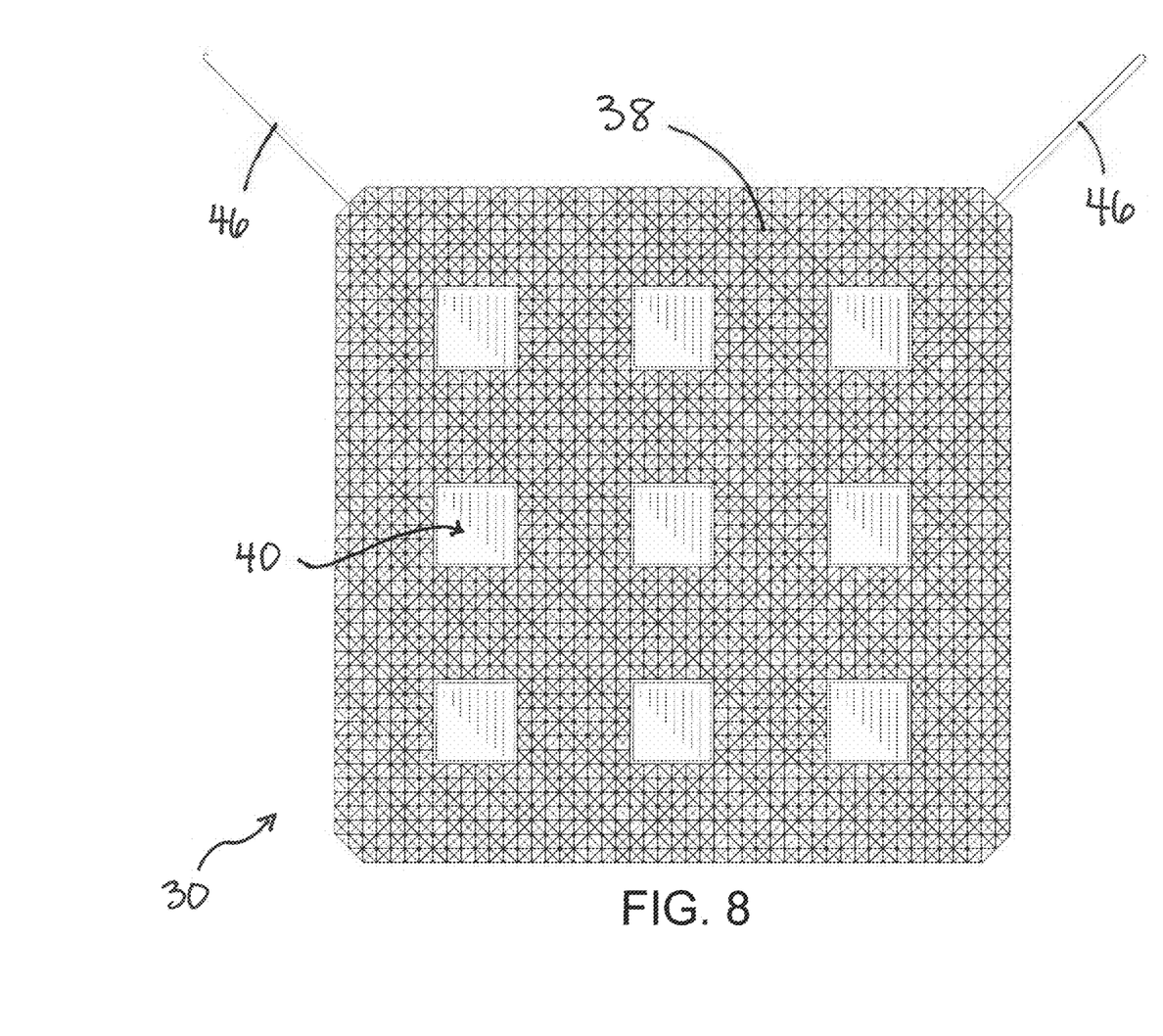
FIG. 8 is a top plan view of the stack with top plate of FIGS. 6-7.

Referring to FIGS. 6 and 7, a top plate 30 can be disposed on a prior art cribbing stack 10 in prior art. The surface 38 of one side of the top plate 30 contacts and interlocks with the surface 14 of lumber pieces 12. The surface 38 of another side of the top plate 30 may contact with the object, such as the supporting arm of a utility truck. A worker may utilize both levels (not shown here) to adjust the lumber pieces 12 of the cribbing stack 10 or the wedges underneath the cribbing stack 10 to maintain both the top plate 30 and cribbing stack 10 at a horizontal level so as to provide maximum supporting effects and stabilizations to the object, such as a utility truck.

It is important that the top plate 30 be wider than one of the pieces of lumber 12 on the top of the stack to help prevent the pieces of lumber at the top of the stack from separating. In some exemplary embodiments, the top plate is wide enough to engage at least some of the interlock texture of every piece of lumber 12 on the top of the stack, e.g., as wide as width "A" in FIG. 1. In the exemplary embodiment of FIGS. 4-8, the top plate 30 is as long as the pieces of lumber 12 are long and wide enough to cover all of the interlock texture of every piece of lumber 12 on the top of the stack as shown in the side view of FIG. 7 and the top view of FIG. 8.

An exemplary method comprises: providing a stack 10 of cribbing having lumber 12 having a plurality of lumber pieces 12 across the top of the stack, the lumber pieces having at least one of an interference texture and notches on their upward-facing sides; providing a top plate 30 having at least one of an interference texture and notches on at least its bottom face to interlock with the top pieces of lumber 12, the top plate being wide enough to interlock with all of the top lumber pieces 12; positioning the plate 30 on the top of the stack 10 interlocked with the top pieces of lumber 12 to help keep them from laterally separating under load, e.g., to keep the lifting bag from separating the pieces 12.

Figure 9:
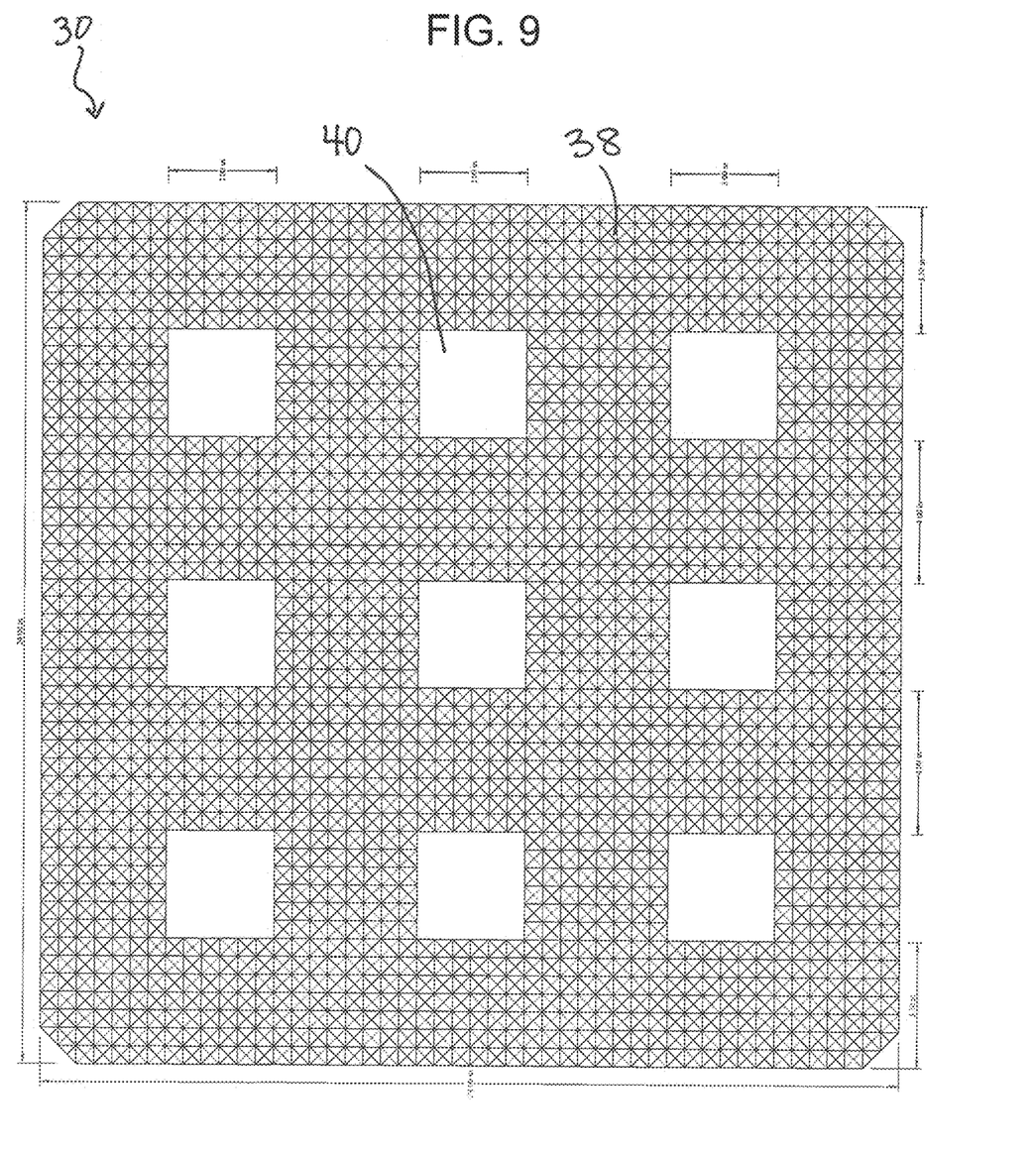
FIG. 9 shows exemplary dimensions of an exemplary top plate.

In exemplary embodiments, the plate is about 1" to about 2½" thick. Some exemplary implementations are about 2' by about 2' and 1½-2½" thick, e.g., about 2" thick (FIG. 9). Other exemplary implementations are about 1½' by about 1½' and 1-2" thick, e.g., about 1½" thick. Thus, the plate can be substantially thinner than the lumber pieces 12, e.g., about half as thick or about a third as thick, as the corresponding lumber pieces 12 (see the Appendix to Pat. Appl'n Ser. No. 62/266,356 for lumber piece dimensions for the corresponding 2' and 1½' lumber pieces).

Figure 10A:
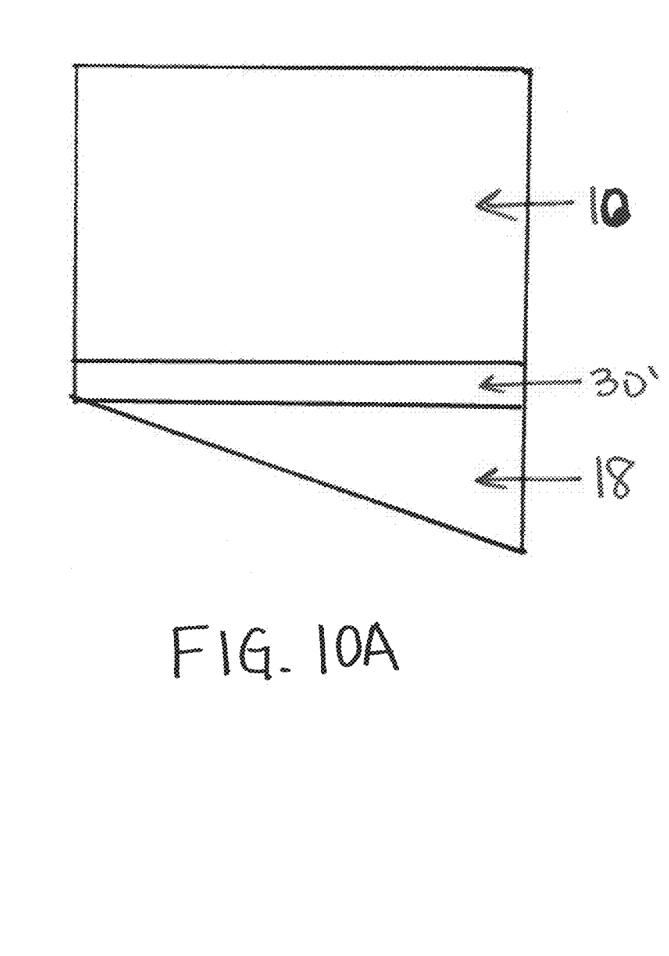
FIGS. 10A and 10B show various depictions of uses of a plate as a bottom plate.
Figure 10B:
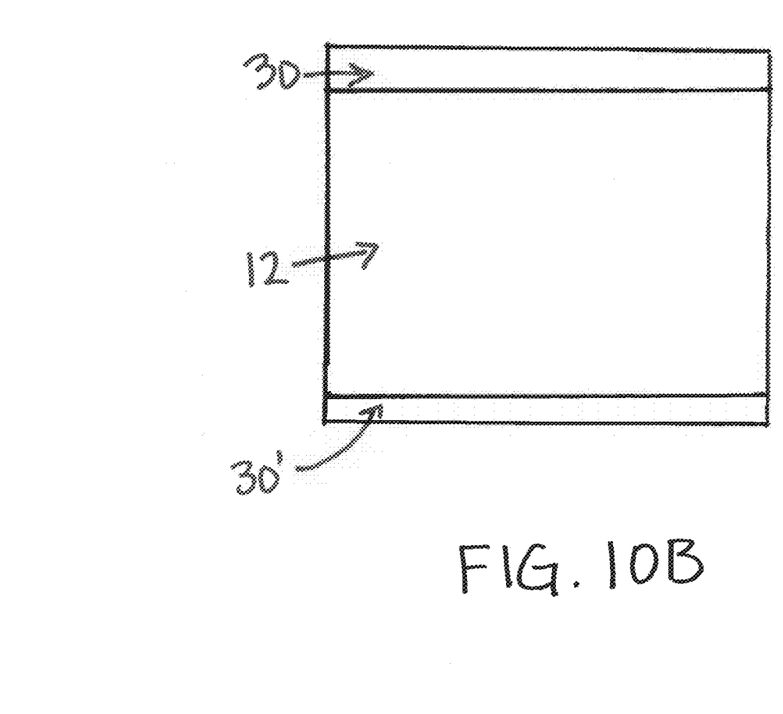
Figure 11A:
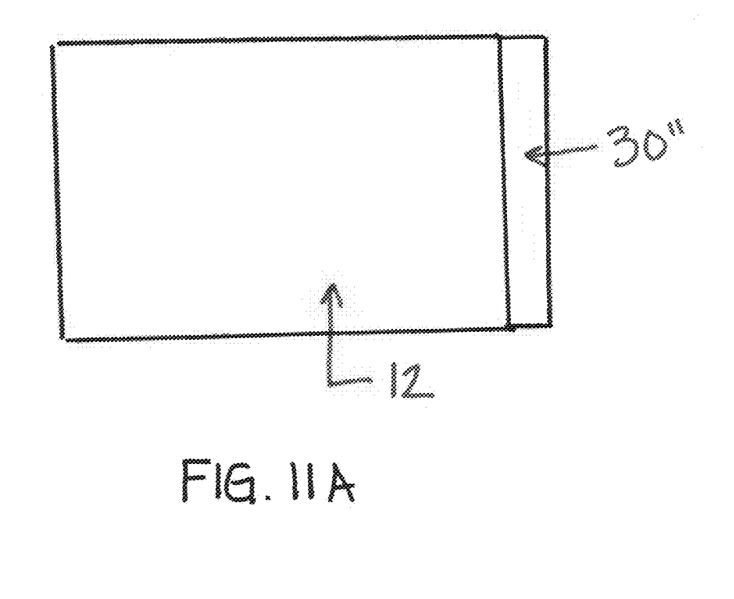
FIGS. 11A and 11B show various depictions of uses of a plate as an intermediate plate.
Figure 11B:
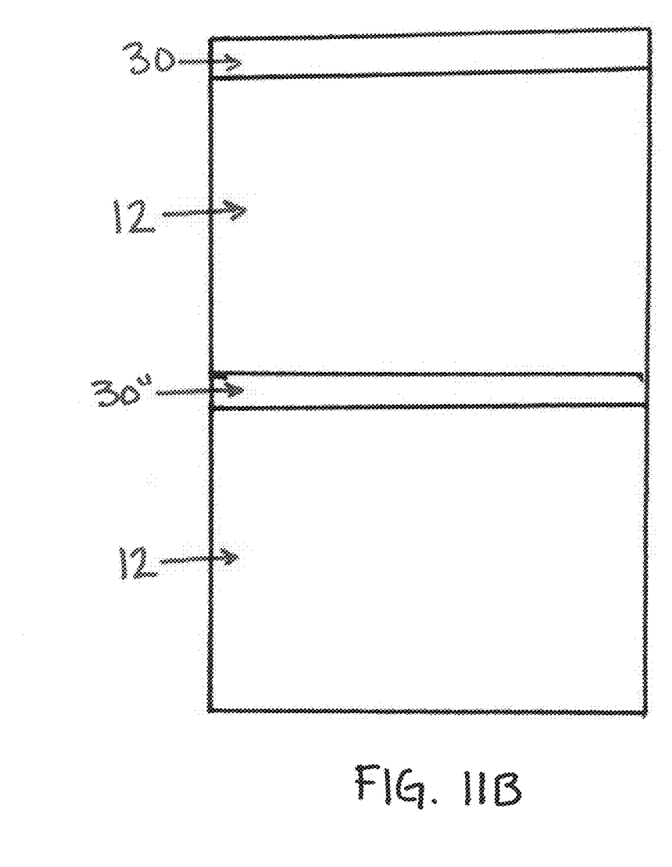

In some exemplary embodiments, the top plate 30 is used in the configuration of FIGS. 3A and 3B, e.g., between the stack 10 and the top bag pad 16. Additionally, as shown in FIG. 10A, although the plate 30 has been described herein as a top plate, those skilled in the art will appreciate from the teachings herein that the plate 30 can be used as a "bottom plate" 30' in the configuration of FIGS. 3A and 3B, e.g., between the stack 10 and the wedge members 18 (which wedge members 18 can be longitudinal pieces, like the lumber pieces 12), or, as shown in FIG. 10B, a bottom plate 30' at the bottom of the stack of FIGS. 6-7 (the bottom pieces 12 would have to be rotated 90 degrees so the interlocking texture is bottom-facing to allow the texture on the plate 30' to interlock). Moreover, as shown in FIGS. 11A and 11B, in exemplary applications, e.g., for tall stacks 10 or for very high loads, one could use a plate 30 as an intermediate plate 30" between one or more of the layers of lumber pieces 12, e.g., one plate 30" adjacent the third tier of lumber pieces 12 in the stacks shown, as shown in FIG. 11A, or one plate 30" between every two tiers of lumber pieces 12 (the intermediate pieces 12 would have to be rotated 90 degrees so the interlocking texture is facing the plate 30" to allow the texture on the plate 30" to interlock), as shown in FIG. 11B. In some exemplary embodiments, a top plate 30 and a bottom plate 30 are used. In some exemplary embodiments, top plate 30, a bottom plate 30', and one or two intermediate plates 30" are used.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the steps of all processes and methods herein can be performed in any order, unless two or more steps are expressly stated as being performed in a particular order, or certain steps inherently require a particular order. As another example, other non-slip surfaces can be used between the lumber pieces 12 and the plate 30, e.g., the plate can have notches on at least its bottom face to interlock with the top pieces of lumber 12. As still another example, the top and bottom of the plates 30, 30' can have different textures, e.g., one side can have the pyramidal larger texture or notches to interlock with the lumber pieces 12 on the stack 10 and the other side can have a different texture, e.g., a smooth surface with a coating of high-friction material to engage the top pad 16 (e.g., a coating of non-skid material, such as the same material as the bag pad 16). Accordingly, departures may be made from such details without departing from the spirit or scope of the applicant's general inventive concept.

What is claimed is:

1. A method for stabilizing a cribbing stack, comprising:
   providing a cribbing stack;
   providing a substantially flat top plate comprising two levels, wherein the levels are each attached to a side surface of the top plate and are disposed in a non-parallel relationship with respect to each other, and further wherein the levels are each positioned within a respective indentation in the side surfaces;

disposing the top plate on the cribbing stack; and adjusting cribbing stack so that the top plate is horizontal using the levels.

2. The method of claim 1, wherein the levels are in an orthogonal relationship.

3. The method of claim 1, wherein the top plate comprises at least one layer and further wherein the levels are disposed under adjacent edges of the at least one layer.

4. The method of claim 1, wherein the top plate comprises at least one layer and further wherein at least one side of the at least one layer has a pyramid locking surface.

5. The method of claim 1, wherein the top plate comprises at least one layer and further wherein at least one side of the at least one layer has at least one recess without a pyramid locking surface.

6. The method of claim 1, wherein the top plate is substantially square.

7. The method of claim 1:

wherein the cribbing stack comprises pieces of lumber, wherein the top of the cribbing stack comprises at least three pieces of lumber positioned side by side, and wherein the top surface of the stack has an interlock texture; and wherein the top plate is as long as the pieces of lumber are long and wide enough to cover all of the interlock texture of every piece of lumber on the top of the stack.

8. The method of claim 1:

wherein the cribbing stack comprises pieces of lumber, wherein the top of the cribbing stack comprises at least three pieces of lumber positioned side by side, and wherein the top surface of the stack has an interlock texture; and wherein the top plate covers all of the interlock texture of every piece of lumber on the top of the stack.

\* \* \* \* \*